(12) United States Patent
Kashiwase

(10) Patent No.: US 6,383,106 B1
(45) Date of Patent: May 7, 2002

(54) POWER TRANSMITTING SYSTEM FOR A HYBRID MOTOR

(75) Inventor: Hajime Kashiwase, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/663,270

(22) Filed: Sep. 18, 2000

Related U.S. Application Data

(62) Division of application No. 09/216,132, filed on Dec. 18, 1998, now Pat. No. 6,146,302.

(30) Foreign Application Priority Data

| Dec. 26, 1997 | (JP) | 9-359909 |
| Jan. 12, 1998 | (JP) | 10-004080 |
| Jan. 16, 1998 | (JP) | 10-006755 |
| Jan. 16, 1998 | (JP) | 10-006756 |
| Feb. 3, 1998 | (JP) | 10-022210 |
| Feb. 3, 1998 | (JP) | 10-022211 |

(51) Int. Cl.⁷ ............... F16H 3/72; F16H 48/06
(52) U.S. Cl. ............... 475/5; 475/210
(58) Field of Search ............... 475/5, 2, 210; 477/3, 118, 183; 180/65.3, 65.4, 65.7

(56) References Cited

U.S. PATENT DOCUMENTS

| 5,569,108 A | * | 10/1996 | Cade'e et al. | 475/210 X |
| 5,577,973 A | * | 11/1996 | Schmidt | 475/5 |
| 5,603,671 A | * | 2/1997 | Schmidt | 475/5 |
| 5,902,210 A | * | 5/1999 | Kobayashi et al. | 477/118 |
| 5,904,631 A | * | 5/1999 | Morisawa et al. | 475/5 |
| 6,048,288 A | * | 4/2000 | Tsujii et al. | 477/5 |
| 6,048,289 A | * | 4/2000 | Hattori et al. | 477/5 X |
| 6,203,468 B1 | * | 3/2001 | Nitta et al. | 477/5 |
| 6,244,368 B1 | * | 6/2001 | Ando et al. | 180/65.2 |

FOREIGN PATENT DOCUMENTS

| JP | 0150540 | * 8/1990 | 475/210 |
| JP | 946821 | 2/1997 | |
| JP | 9100853 | 4/1997 | |

* cited by examiner

*Primary Examiner*—Rodney H. Bonck
*Assistant Examiner*—Roger Pang
(74) *Attorney, Agent, or Firm*—Martin A. Farber

(57) ABSTRACT

The system has an engine, and a planetary gear. The planetary gear has a sun gear, a carrier rotatably supporting a plurality of pinions each of which engages with the sun gear, a ring gear engaging with the pinions. A first motor is connected to an output shaft of the engine and the sun gear of the planetary gear. The first motor is capable of using as a driving source and as a power generator. A second motor is connected to the ring gear. The second motor is also capable of using as a driving source and as a power generator. An automatic transmission is connected between the carrier of the planetary gear and an axle of a hybrid motor vehicle.

10 Claims, 15 Drawing Sheets

POWER TRANSMITTING SYSTEM FOR A HYBRID MOTOR

RELATED APPLICATION

This application is a divisional application of my application Ser. No. 09/216,132 filed Dec. 18, 1998, and now U.S. Pat. No. 6,146,302 the entire contents of which is hereby incorporated by reference herein.

BACKGROUND OF THE INVENTION

The present invention relates to a power transmitting system for a hybrid motor vehicle using an internal combustion engine and an electric motor.

Recently, there has been developed the hybrid vehicle which is driven by the engine and the motor from the point of view of low pollution and resource economy.

In the hybrid motor vehicle, two motors which are selectively used as a power source and as a power generator are mounted, thereby increasing energy efficiency and driving performance.

Japanese Patent Application Laid Open 9-46821 discloses a hybrid motor vehicle in which a power distribution mechanism using a differential distributor such as a differential gear is used for distributing a part of engine power for a power generator so that the power by power generator is used for driving a motor so as to drive the motor vehicle.

Japanese Patent Application Laid Open 9-100853 discloses a hybrid motor vehicle where a planetary gear is provided for distributing engine power to a power generator.

However, in the above described prior arts, a great part of the driving power at low vehicle speed is relied on the motor. Accordingly, it is necessary to mount a large motor having a large output, and to provide a power generator having a large power in order to maintain a constant running performance. As a result, the cost for manufacturing the motor vehicle increases.

Furthermore, in the case that the rotation speed of the output shaft of an engine changes over a control range for controlling the motor speed, it is difficult to properly control the engine and the motor in response to requested driving force, only by distributing the power of the engine to the power generator.

SUMMARY OF THE INVENTION

An object of the present invention is to provide a power transmitting system for a hybrid motor vehicle which may ensure necessary driving force and increase the energy efficiency by using two motors, and may properly control the engine and the motors in response to requested driving force.

According to the present invention, there is provided a power transmitting system for a hybrid motor vehicle comprising, an engine, a planetary gear having a sun gear, a carrier rotatably supporting a plurality of pinions each of which engages with the sun gear, a ring gear engaging with the pinions, a first motor connected to an output shaft of the engine and the sun gear of the planetary gear, and capable of using as a driving source and as a power generator, a second motor connected to the ring gear and capable of using as a driving source and as a power generator, and a transmission connected between the carrier of the planetary gear and an axle of the motor vehicle.

The present invention further provides a power transmitting system for a hybrid motor vehicle comprising, an engine, a planetary gear having a sun gear, a carrier rotatably supporting a plurality of pinions each of which engages with the sun gear, a ring gear engaging with the pinions, a first motor connected to an output shaft of the engine and the ring gear of the planetary gear, and capable of using as a driving source and as a power generator, a second motor connected to the sun gear and capable of using as a driving source and as a power generator, and a transmission connected between the carrier of the planetary gear and an axle of the motor vehicle.

The present invention still further provides a power transmitting system for a hybrid motor vehicle comprising, an engine, a planetary gear having a sun gear, a carrier rotatably supporting a plurality of pinions each of which engages with the sun gear, a ring gear engaging with the pinions, a first motor connected to an output shaft of the engine and the ring gear of the planetary gear, and capable of using as a driving source and as a power generator, a second motor connected to the carrier and capable of using as a driving source and as a power generator, and a transmission connected between the carrier of the planetary gear and an axle of the motor vehicle.

A clutch is provided for engaging two members selected from the sun gear, ring gear and carrier of the planetary gear.

The transmission may be a continuously variable belt-drive automatic transmission.

These and other objects and features of the present invention will become more apparent from the following detailed description with reference to the accompanying drawings.

DETAILED DESCRIPTION OF THE PREFERRED EMBODIMENTS

The first embodiment of the present invention will be described hereinafter with reference to FIG. 1.

Figure 1:
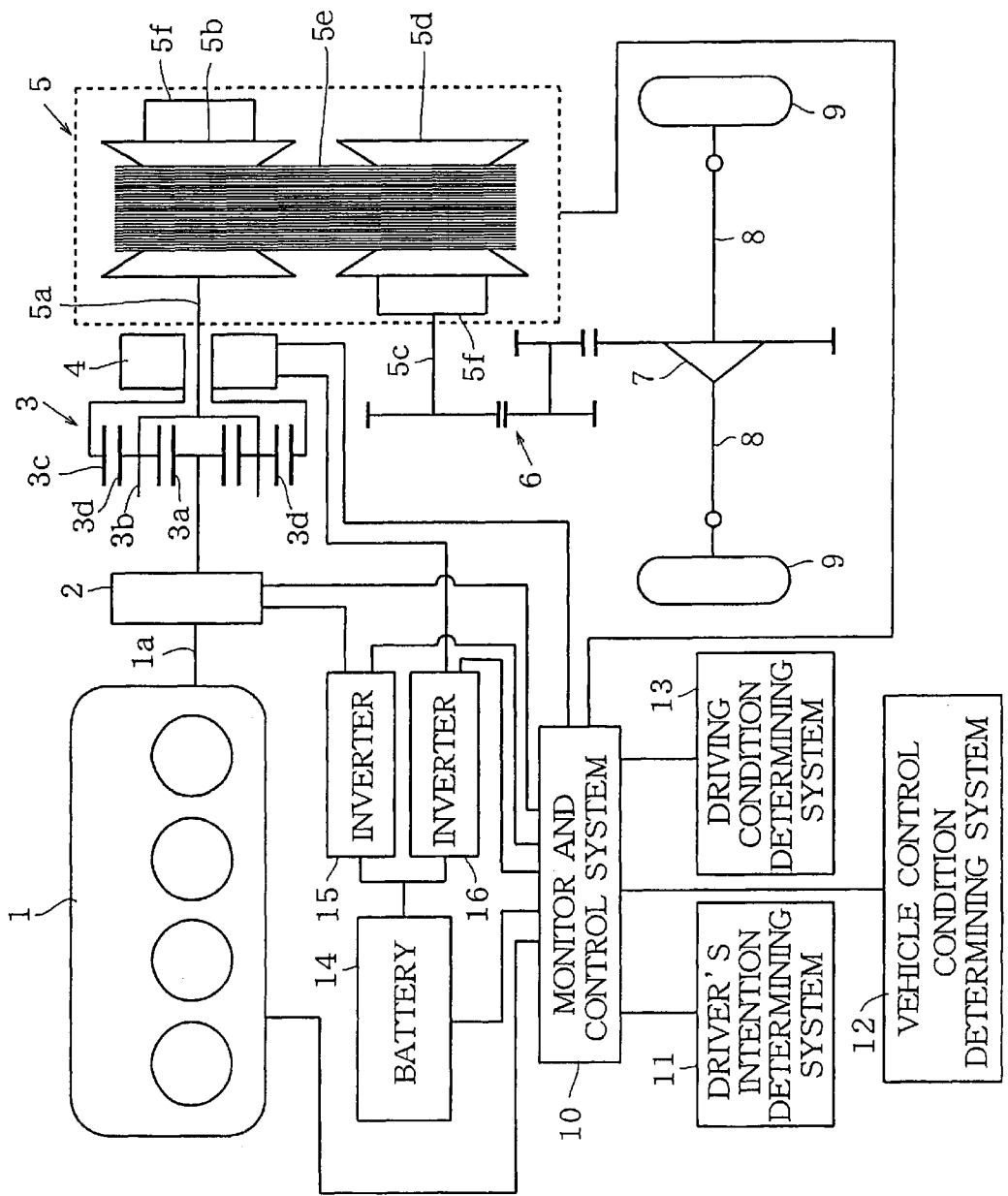
FIG. 1 is a block diagram showing a system according to a first embodiment of the present invention.

FIG. 1 shows a power transmitting system for a hybrid vehicle. The system comprise an engine 1, a first motor 2 a rotating shaft of which is connected to an output shaft 1a of the engine 1, a planetary gear 3 connected to the rotating shaft of the first motor 2, a second motor 4 connected to the planetary gear 3, and a continuously variable transmission (hereinafter called CVT) 5.

The first motor 2 is provided for generating electric power and assisting engine power, and the second motor 4 is provided for assisting the engine power and receiving the energy at deceleration.

The planetary gear 3 comprises a sun gear 3a connected to the rotating shaft of the first motor 2, a plurality of pinions 3d each engaging with the sun gear 3a, a carrier 3b rotatably supporting the pinions 3d, and a ring gear 3c meshed with the pinions 3d. The ring gear 3c is connected to a rotating shaft of the second motor 4.

The CVT 5 is a continuously variable belt-drive automatic transmission. The CVT 5 comprises a primary pulley 5b connected to an input shaft 5a which is connected to the carrier 3b of the planetary gear 3, a secondary pulley 5d connected to an output shaft 5c, and a belt 5e wound on both pulleys 5b and 5d. Each of the pulleys 5b and 5d comprises an axially fixed conical disc and axially movable conical disc. The movable discs are moved by oil pressure in cylinders 5f in the opposite direction so that the effective diameter of each of pulleys 5b and 5d is changed. Thus, the transmission ratio can be continuously changed.

Other transmissions such as a transmission comprising gear trains and an automatic transmission using a torque converter may be employed instead of the CVT.

The output shaft 5c of the CVT 5 is connected to an axle 8 through a gear train 6 and a differential gear 7, thereby transmitting the output of the CVT 5 to driving wheels 9.

A monitor and control system 10 is provided for controlling the engine 1, motors 2 and 4, and CVT 5. Connected to the monitor and control system 10 are a driver's intention determining system 11, a vehicle control condition determining system 12, and a driving condition determining system 13.

The driver's intention determining system 11 detects depression operation of accelerator pedal and brake pedal, and steering angle, thereby determining driving operation condition dependent on the operation of the driver. The vehicle control condition determining system 12 determines brake pedal depression condition, control quantity for the engine and the ABS (Anti-lock Braking System), and operating conditions of lights, an air conditioner and others. The driving condition determining system 13 determines the change of driving conditions such as vehicle speed, ascending and descending, and road surface conditions.

In dependency on outputs of those systems, the monitor and control system 10 controls operations of the engine 1 and motors 2 and 4, the oil pressure in cylinders 5f of the CVT 5, the charging of a battery 14.

The operation of the control system of the present invention will be described hereinafter.

In the case where the engine 1 is operated in an optimum condition for the emission control, fuel consumption and others, the output power of the engine is insufficient for driving the hybrid vehicle, the motor 2 is operated in order to make up the insufficiency. If the power is insufficient despite of the power supplement by the motor 2, the motor 4 is operated to obtain necessary driving power.

More particularly, a DC voltage from the battery 14 is converted to AC voltages by inverters 15 and 16. The AC voltages are applied to the motors 2 and 4 to operate the motors, respectively. The driving force of the motor 2 is added to the driving force of the engine 1 to make input torque Ts which drives the sun gear 3a of the planetary gear 3. The driving force of the motor 4 is applied to the ring gear 3c as input torque Tr.

The output torque Tc of the carrier 3b is expressed by the following equation (1) based on the input output characteristic of the planetary gear 3.

$$Tc = Ts + Tr \tag{1}$$

Namely the output torque Tc of the planetary gear 3 is the sum of the input torque Ts to the sun gear 3a and the input torque Tr to the ring gear 3c.

Therefore, it is possible to produce large driving force, even if the output torque of each of the engine 1 and motors 2 and 4 is small. Thus, large vehicle driving force is transmitted to the driving wheels 9 through the CVT 5 and the gear train 6.

Figure 2:
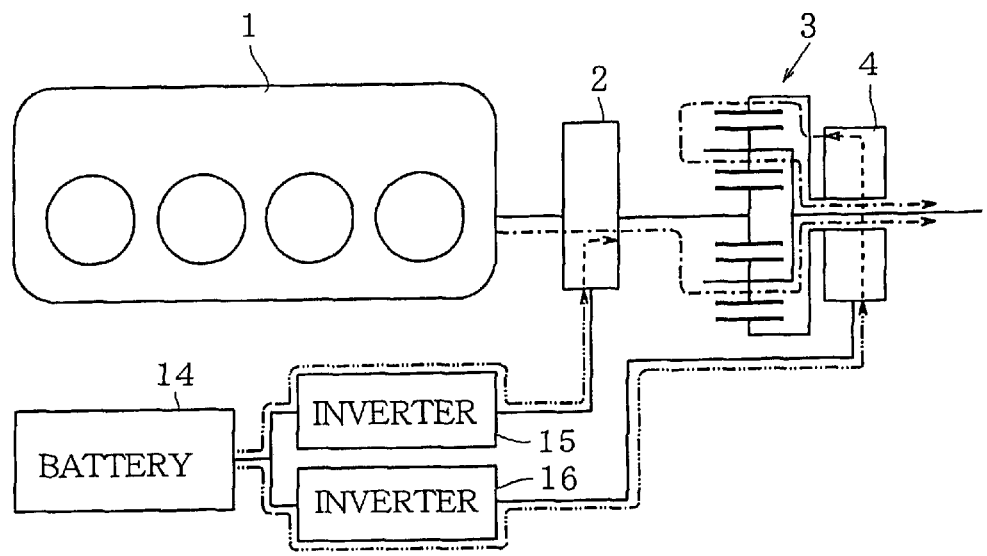
FIGS. 2 to 6 are block diagrams for explaining operations of the system.

FIG. 2 shows flows of the electric current represented by the two-dot-dash line and of the torque represented by the one-dot-dash line.

In order that the input torque Ts to the sun gear 3a and the input torque Tr to the ring gear 3c are added, each torque must be set to receive the reaction force. To this end, the torque Ts and torque Tr must satisfy the relationship of the following formula (4) obtained from the formulae (2) and (3).

$$Tc \cdot i/(1+i) = Ts \tag{2}$$

$$Tc \cdot 1/(1+i) = Tr \tag{3}$$

$$Ts = i \cdot Tr \tag{4}$$

where i is the gear ratio represented by the number of teeth Zs of the sun gear 3a and the number of teeth Zr of the ring gear 3C (i=Zs/Zr).

In the planetary gear, since Zr is larger than Zs (Zr>Zs), the gear ratio i is smaller than 1 (i<1). Therefore, as is apparent from the formula (4), the input torque Tr of the ring gear 3c is 1/i times (1/i>1) of the input torque Ts of the sun gear 3a.

Since as described above, the input torque Tr of the ring gear 3c is generated only by the electric power supplied to the motor 4, there is the case where the charging quantity to the battery 14 becomes insufficient because of a long driving. In such a case, the motor 2 is used as a power generator, and the motor 4 is operated by the generated power as described hereinafter in detail.

In each of the inverters 15 and 16, a control circuit is provided to changeover the flow of the electric current such that the electric current flows from the battery 14 to the corresponding motor 2, 4 when using the motor as a driving motor, and reversely flows from the corresponding motor 2 or 4 to the battery 14 when using the motor as a power generator.

Therefore, in order to use the motor 2 as the power generator, the control circuit in the inverter 15 is changed such that a part of the driving force of the engine drives the motor 2 to generate the electric power, and the remaining driving power is applied to the sun gear 3a.

Figure 3:
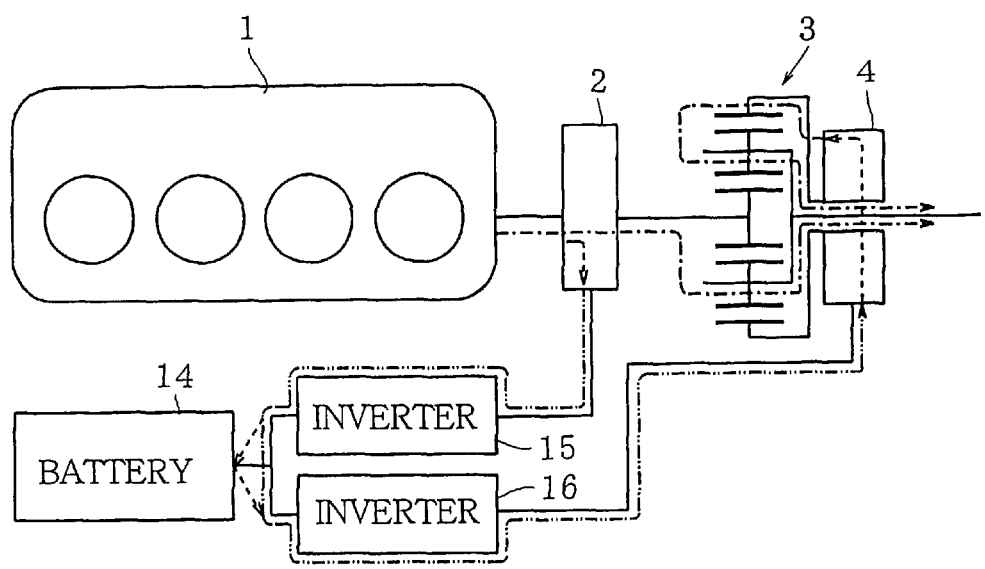

If the power generated by the motor 2 is sufficient, the motor 4 is driven only by the generated power without using the electric power charged in the battery 14 as shown in FIG. 3.

In that case, it is possible that the hybrid vehicle is driven only by the driving force of the engine by using the motor 4 to receive the reaction force of the ring gear 3c.

In the above described condition, when the charging of the battery 14 becomes necessary, the system is controlled so that the power generating quantity of the motor 2 becomes larger than the necessary electric power for the motor 4. More particularly, in each of the inverters 15 and 16, a circuit is provided for controlling the load on the corresponding motor 2, 4 as a power generator. By controlling the load, the generating power of the motor 2, 4 can be increased or reduced. Furthermore, a control circuit is provided in each of the inverters 15, 16 for controlling the power supplied from the battery 14 to the corresponding motor 2, 4.

When it is necessary to increase the driving force of the motor 4 because of a heavy load at climbing, rapid acceleration, or others, the driving force of the engine 1 applied to the sun gear 3a is increased by reducing the driving force to the motor 2, and the electric power of the battery 14 is supplied to the motor 4 to increase the driving force thereof. Thus, necessary driving force can be obtained.

Figure 4:
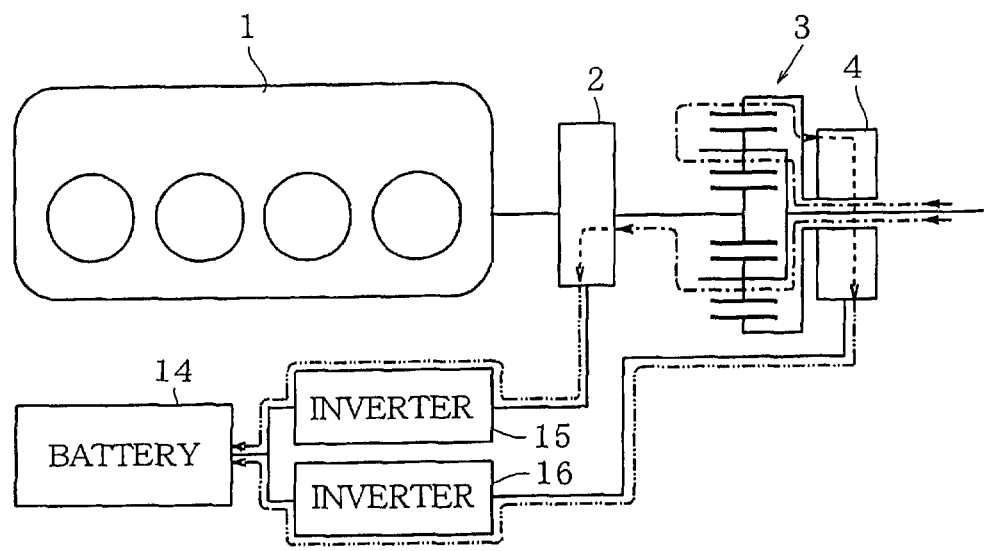

On the other hand, at the deceleration or braking, the torque Tc reversely transmitted to the carrier 3b from the driving wheels 9 through the CVT 5 is distributed as the torque Ts through the sun gear 3a to the motor 2, and as the torque Tr through the ring gear 3c to the motor 4, as shown in FIG. 4. The distributed torque is converted to electric energy with which the battery 14 is charged. Namely, the vehicle is braked and decelerated by the power generation of the motors 2 and 4. In the case, although the power generating quantity and braking force by each motor is small, the whole power generating quantity and breaking force for the vehicle is obtained. Thus, the power energy efficiency can be largely improved.

Figure 5:
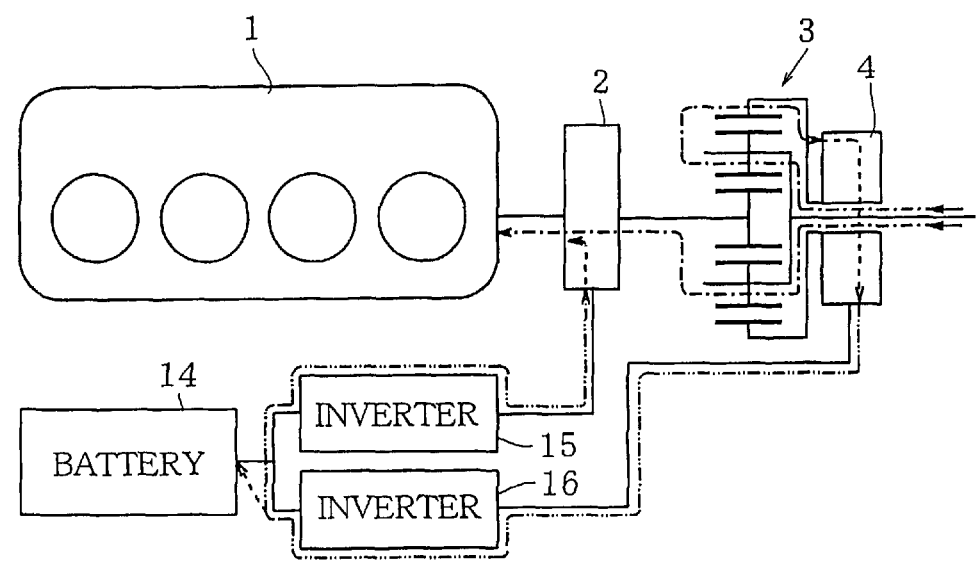
Figure 6:
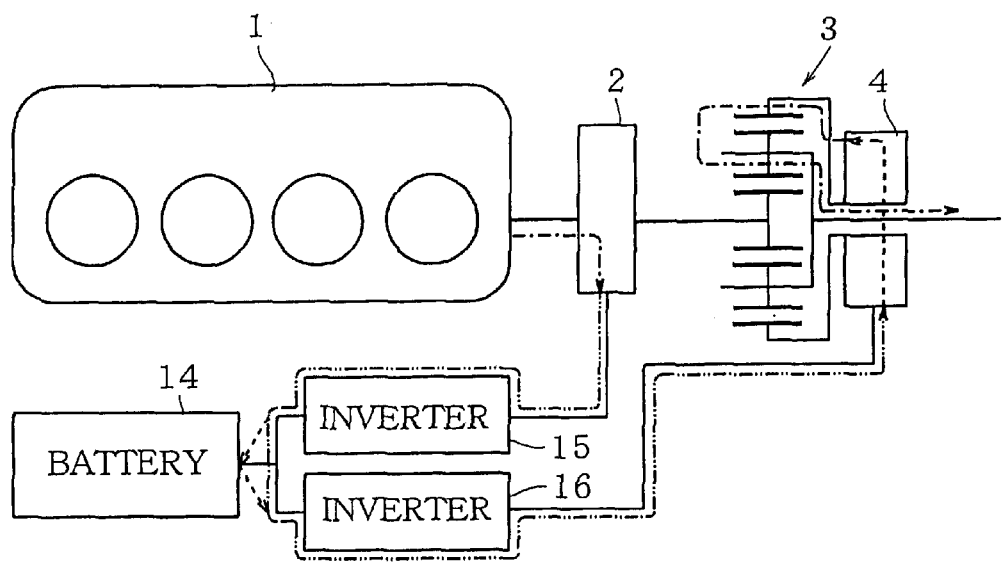

When the battery 14 is sufficiently charged and therefore the power generated by the motor 4 is not absorbed by the battery 14, the engine braking is not effected by the motor 4. In such a case, the electric power generated by the motor 4 is used for driving the motor 2 as shown in FIG. 5, so that the driving force generated by the motor 2 and the distributed driving force through the sun gear 3a are both applied to the engine 1 to obtain the engine braking effect. When the battery charging becomes necessary, the electric power generated by the motor 4 is controlled such that the electric power supplied to the motor 2 is reduced, and the battery 14 is charged with the remaining power.

When the vehicle is backed, the motor 4 is reversed to reversely rotate the carrier 3b of the planetary gear 3.

In that case, the motor 2 absorbs the output of the engine 1 so as to be operated as the power generator, thereby driving the motor 4 by the electric power generated by the motor 2. Furthermore, when the charged quantity of the battery 14 becomes insufficient, the output power of the engine is increased to increase the power generated by the motor 2, thereby driving the motor 4 while charging the battery 14.

Alternatively, subject to that the battery 14 is sufficiently charged and the sun gear 3a is stuck by means of the motor 2, the engine can be stopped while the vehicle is backed by reversely operating the motor 4.

As described above, the engine 1 and motors 2 and 4 are properly controlled by using the CVT 5 to increase the power efficiency.

In the planetary gear train, the revolution per minute (hereinafter called rpm) of each part is expressed by the following formula (5).

$$(1+i) \cdot Nc = Nr + i \cdot Ns \qquad (5)$$

where Ns is the rpm of the sun gear 3a, Nr is the rpm of the ring gear 3c, and Nc is the rpm of the carrier 3b.

Therefore, the rpm Nc of the carrier 3b can be properly set by controlling the rpm Ns and the rpm Nr. When Ns=Nr, the rotations become Nc=Nr=Ns.

However if the rpm of one of the motor 2 or 4 is set constant the rpm of the other motor must be increased over the rpm of the carrier 3b to increase the output rpm of the planetary gear 3.

For example, considering the rotation of each of the carrier 3b and the ring gear 3c relative to the sun gear 3a in the case where the rpm Ns of the sun gear 3a rotated by the motor 2 is constant, Ns=0 can be inserted in the formula (5). This means that the rpm Nr of the ring gear 3c (difference from the rpm Ns of the sun gear 3a) is (1+i) times of the rpm Nc of the carrier 3b (difference from the rpm Ns of the sun gear 3a).

Moreover considering the rotation of each of the sun gear 3a and the carrier 3b relative to the ring gear 3c in the case where the rpm of the ring gear 3c rotated by the motor 4 is constant, Nr=0 can be inserted in the formula (5). This means that the rpm Ns of the sun gear 3a rotated by the motor 2 is (1+i)/i times of the rpm of the carrier 3b.

As a result, in either case, if the rpm of either of the motors 2 and 4 is constant, the rpm of the other motor becomes larger than the output rpm of the planetary gear 3.

The high rotating speed of the motor causes the efficiency and reliability of the system to decrease. Therefore, it is desirable to control the motors so that the difference between rotating speeds of gears of the planetary gear train becomes small, and the rotating speed of each motor becomes low. At a low vehicle speed, it is possible, by increasing the rotating speed of either of the sun gear 3a and the ring gear 3c, to stop the other gear, or to back the vehicle by reversely rotating the output shaft while keeping the engine rotating.

However, at a high vehicle speed, because of the high speed of the output shaft, speeds of the engine and two motors are increased.

In the present system, it is possible to reduce the input torque to the planetary gear train, and to properly control the rotating speed of the output shaft of the planetary gear 3 by properly controlling the reduction ratio of the CVT.

In other words, it is possible to operate the engine 1 in an optimum range of high combustion efficiency and low exhaust gas emission, by restraining the using conditions of the engine 1 and motors 2 and 4 in an optimum range, and to realize the improvement of fuel consumption and low exhaust gas emission while keeping the driving performance.

In accordance with the first embodiment of the present invention, it is possible to ensure the driving force and to improve the energy efficiency by two small motors each having comparatively low output power, and to achieve the lowering of the manufacturing cost of the system, the miniaturizing and the reducing of weight of the system.

Figure 7:
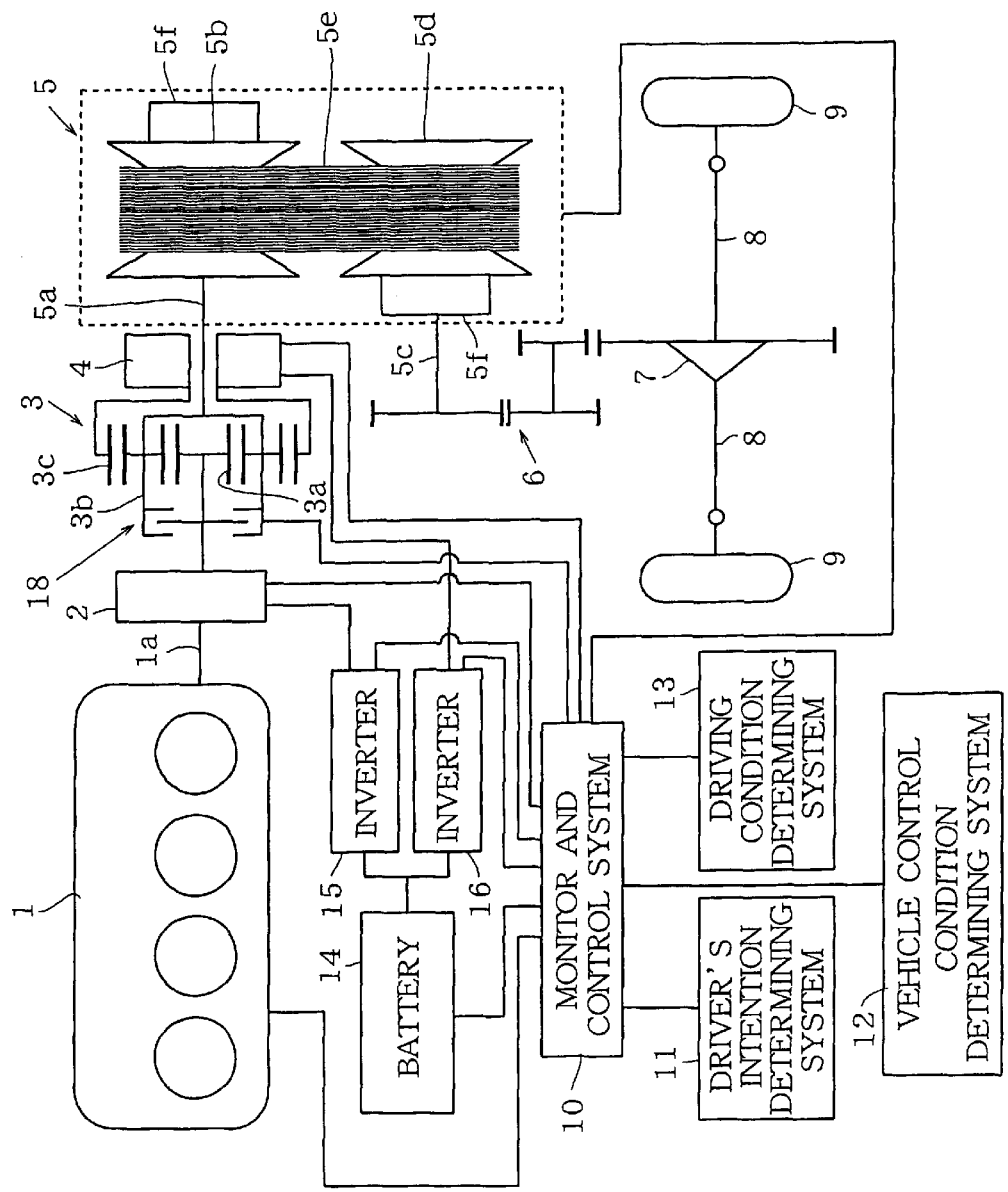
FIG. 7 is a block diagram showing a system according to a second embodiment of the present invention.

FIG. 7 is a block diagram showing the second embodiment of the present invention. The same part as FIG. 1 is identified by the same reference numeral as FIG. 1, and the explanation thereof is omitted.

In the embodiment, a clutch 18 is provided between the sun gear 3a and the carrier 3b.

In the clutch releasing state, the same operation as the first embodiment is carried out.

Figure 8:
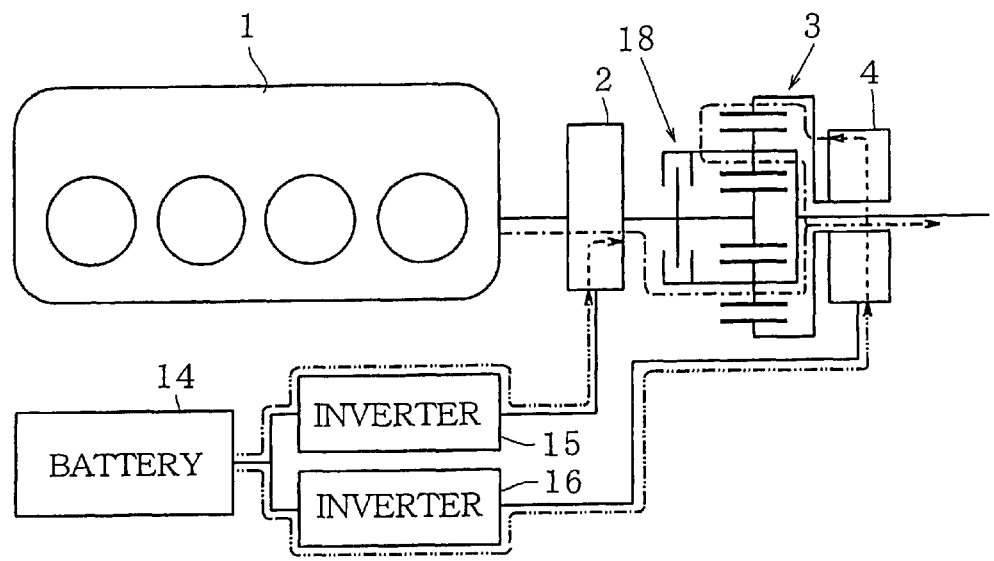
FIGS. 8 and 9 are block diagrams for explaining operations of the system.

In the clutch engaging state, the sun gear 3a and the carrier 18 are connected with each other, so that the engine 1 is directly connected with the CVT 5 through the motors 2 and 4. Therefore, necessary driving torque can be obtained by the integration of the driving torques of the engine 1, motors 2 and/or 4 as shown in FIG. 8. Thus, the control is simplified.

When the driving torque is produced by the engine and motors 2 and 4, the driving torque of the motor 2 and the driving torque of the motor 4 are added to the driving torque of the engine 1 by the planetary gear 3. Therefore, the maximum driving torque is equal to that of the case of FIG. 2. If the motors 2 and 4 are not operated, the system becomes the ordinary driving system for driving the vehicle only by the engine 1.

Figure 9:
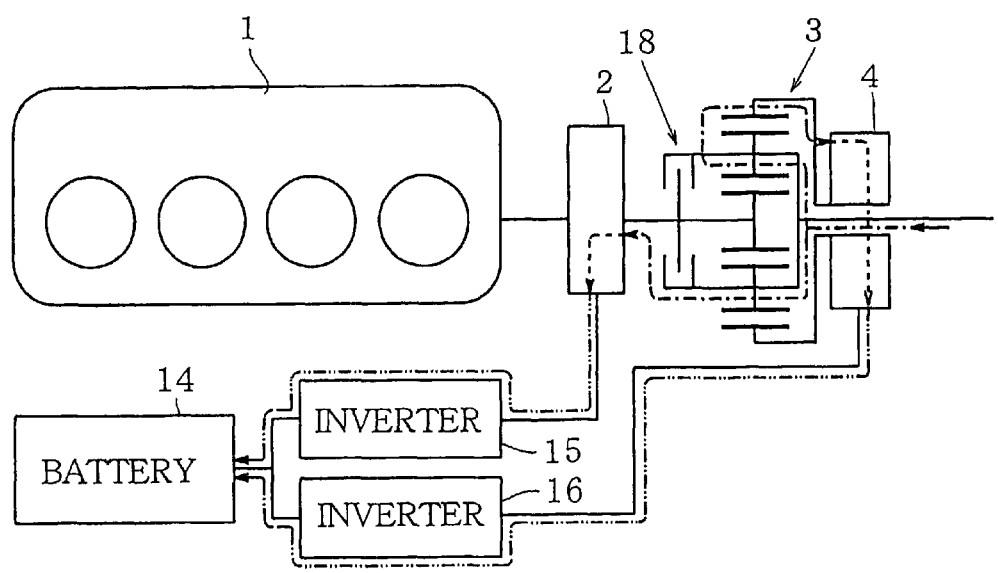

At the deceleration or braking where the vehicle is braked by the control of the motors 2 and 4 and the engine braking, it is possible to properly control the braking torque by the integration of the engine braking and braking due to the power generation of the motors 2 and 4, as shown in FIG. 9, thereby simplifying the control.

Since the braking torque of the motor 2 and the braking torque of the motor 4 are divided by the planetary gear 3, the maximum braking torque is the same as the case of FIG. 4.

In accordance with the second embodiment, the engine can be directly connected to the CVT through the two motors. Therefore, the control of the system becomes simple, and the electric energy can be effectively used.

Figure 10:
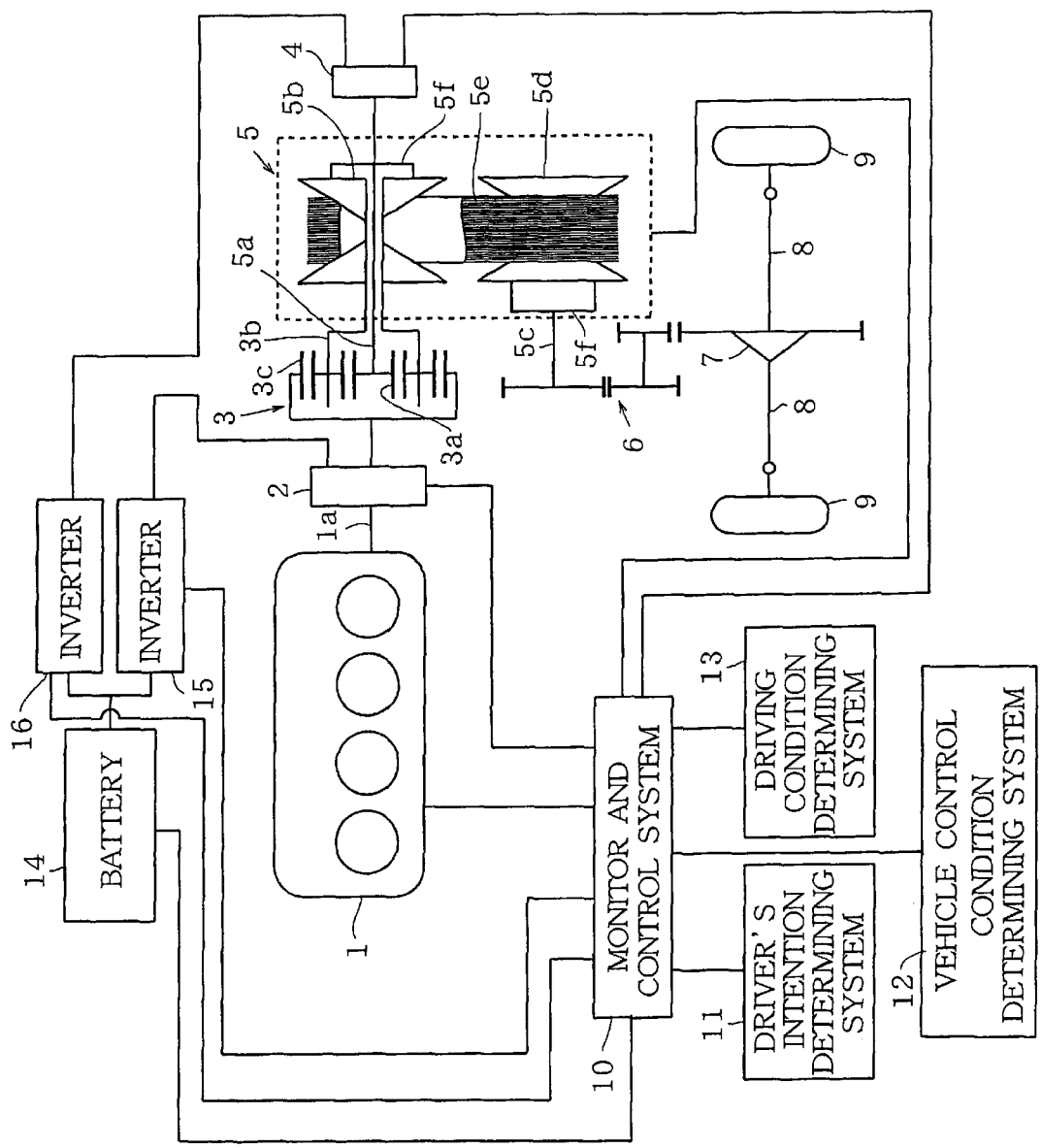
FIG. 10 is a block diagram showing a system according to a third embodiment of the present invention.

FIG. 10 shows the third embodiment of the present invention.

In the system of the third embodiment, the output shaft $1a$ of the engine 1 is connected to the ring gear $3c$ of the planetary gear train 3 through the motor 2, and the motor 4 is connected to the sun gear $3a$ by the shaft $5a$. The system has a composition similar to the first embodiment, and the formulae (1) to (3) are also applied to the system. However, there is the difference that the input torque Ts to the sun gear $3a$ become i times of the input torque Tr to the ring gear $3c$.

Figure 11:
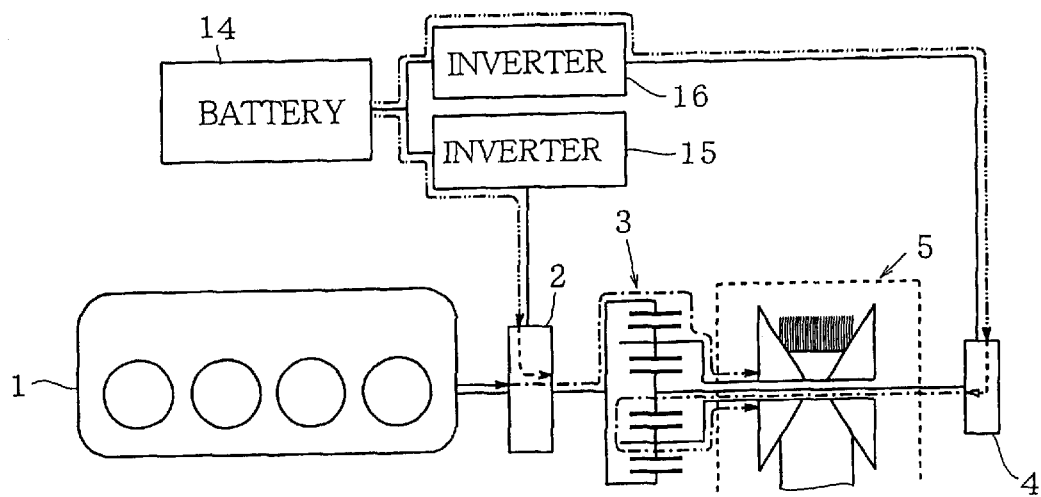
FIGS. 11 to 14 are block diagrams for explaining operations of the system.

FIG. 11 shows the condition where the vehicle is driven by the engine 1 and motors 2 and 4.

Since the engine 1 and the motor 2 are connected to the ring gear $3c$ and the motor 4 is connected to the sun gear $3a$, the input torque Ts to the sun gear $3a$ is a small value (i·Tr).

The motor 2 is used as the power generator and the generated power is used for charging the battery 14 to operate the motor 4.

Figure 12:
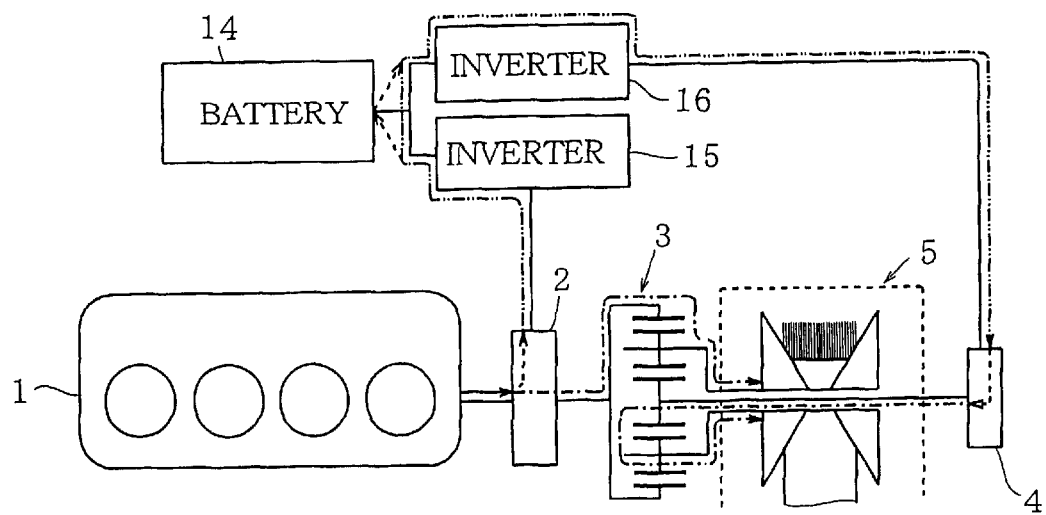

Furthermore, the motor 2 is driven by a part of the driving force of the engine 1 to generate the power which is applied to the motor 4 as shown in FIG. 12. In this case, the motor 4 is operated without using the electric power charged in the battery 14. In such a case, it is possible to use the motor 4 for receiving the reaction force of the sun gear $3a$ and to drive the vehicle only by the engine 1.

Since the input torque Ts to the sun gear $3a$, that is the driving force for the motor 4 is small, it is possible to reduce the influence on the converting efficiency of the torque and electric power of the motor 4 and the control efficiency of the inverters 15, 16.

Figure 13:
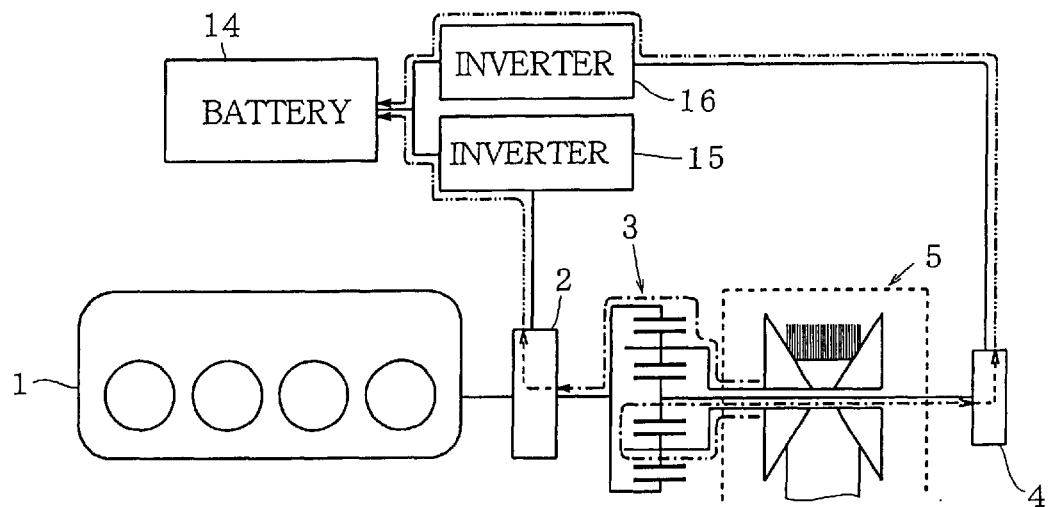

On the other hand, at the deceleration or braking, the torque Tc transmitted to the carrier $3b$ from the driving wheels 9 through the CVT 5 is distributed through the sun gear $3a$ to the motor 2 as the torque Ts, and through the ring gear $3c$ to the motor 4 as the torque Tr, as shown in FIG. 13. The distributed torque is converted to electric energy with which the battery 14 is charged. Namely, the vehicle is braked by the power generation of the motors 2 and 4. In the case, although the power generating quantity and braking force by each motor is small, the whole power generation quantity and breaking force for the vehicle is obtained. Thus, the power energy efficiency can be largely improved.

Figure 14:
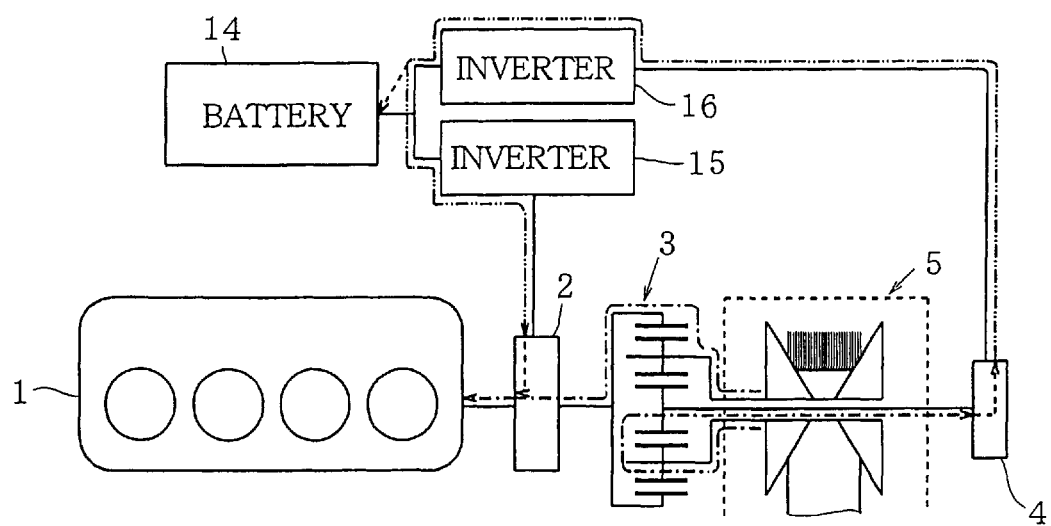

When the battery 14 is sufficiently charged and the power generated by the motor 4 is not absorbed by the battery 14, the engine braking is not effected by the motor 4. In such a case, the electric power generated by the motor 4 is used for driving the motor 2 as shown in FIG. 14, so that the driving force generated by the motor 2 and distributed driving force through the sun gear $3a$ are both applied to the engine 1 to obtain the engine braking effect. When the battery charging becomes necessary, the electric power generated by the motor 4 is controlled such that the electric power supplied to the motor 2 is reduced, and the battery 14 is charged with the remaining power.

The vehicle is backed in the same manner as the first embodiment.

In accordance with the third embodiment, since the torque generated by the motor 4 is small, it is possible to reduce the influence on the converting efficiency between the torque and the electric power. Thus, the energy efficiency can be improved.

Figure 15:
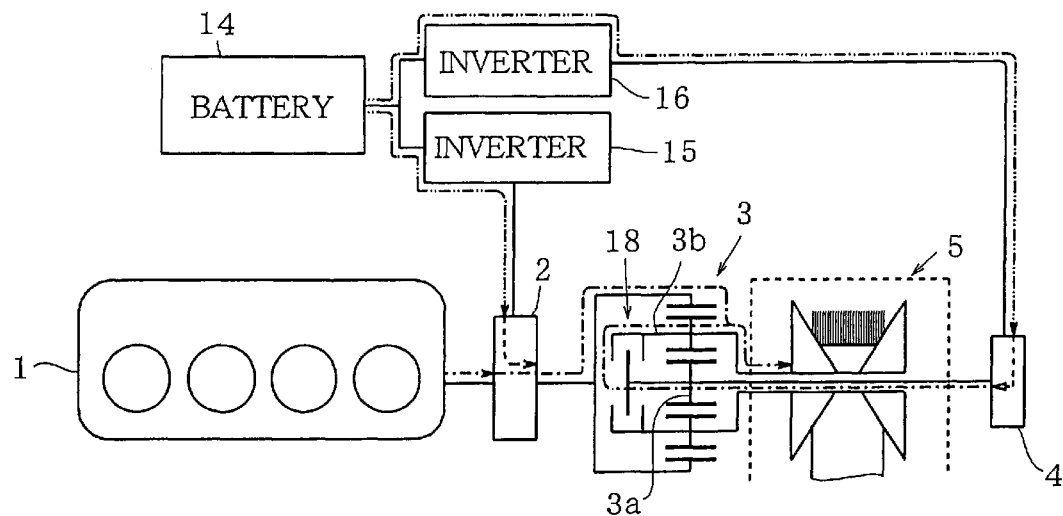
FIG. 15 is a block diagram showing a system according to a fourth embodiment of the present invention.

FIG. 15 shows the fourth embodiment of the present invention. In the embodiment, the clutch 18 is provided between the sun gear $3a$ and the carrier $3b$ in the third embodiment.

In the clutch releasing state, the same operation as the third embodiment is carried out.

In the clutch engaging state, the sun gear $3a$ and the carrier 18 are connected with each other, so that the engine 1 is directly connected with the CVT 5 through the motors 2 and 4. Therefore, necessary driving torque can be obtained by the integration of the driving torque of the engine 1, motors 2 and/or 4 as shown in FIG. 15. Thus, the control is simplified.

When the driving torque is produced by the engine and motors 2 and 4, the driving torque of the motor 2 and the driving torque of the motor 4 are added to the driving torque of the engine 1 by the planetary gear 3. Therefore, the maximum driving torque is equal to that of the case of FIG. 11. If the motors 2 and 4 are not operated, the system becomes the ordinary driving system for driving the vehicle only by the engine 1.

Figure 16:
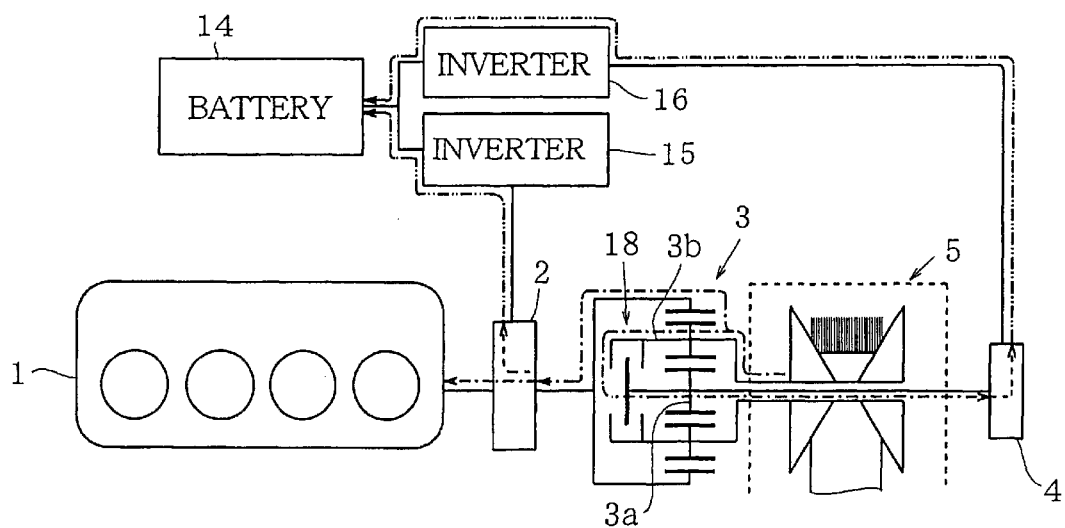
FIG. 16 is a block diagram for explaining an operation of the system.

At the deceleration or braking where the vehicle is braked by the control of the motors 2 and 4 and the engine braking, it is possible to properly control the braking torque by the integration of the engine braking and braking due to the power generation of the motors 2 and 4 as shown in FIG. 16, thereby simplifying the control.

Since the braking torque of the motor 2 and the braking torque of the motor 4 are divided by the planetary gear 3, the maximum braking torque is the same as the case of FIG. 4.

In accordance with the fourth embodiment, the engine can be directly connected to the CVT through the two motors. Therefore, the control of the system becomes simple, and the electric energy can be effectively used.

Figure 17:
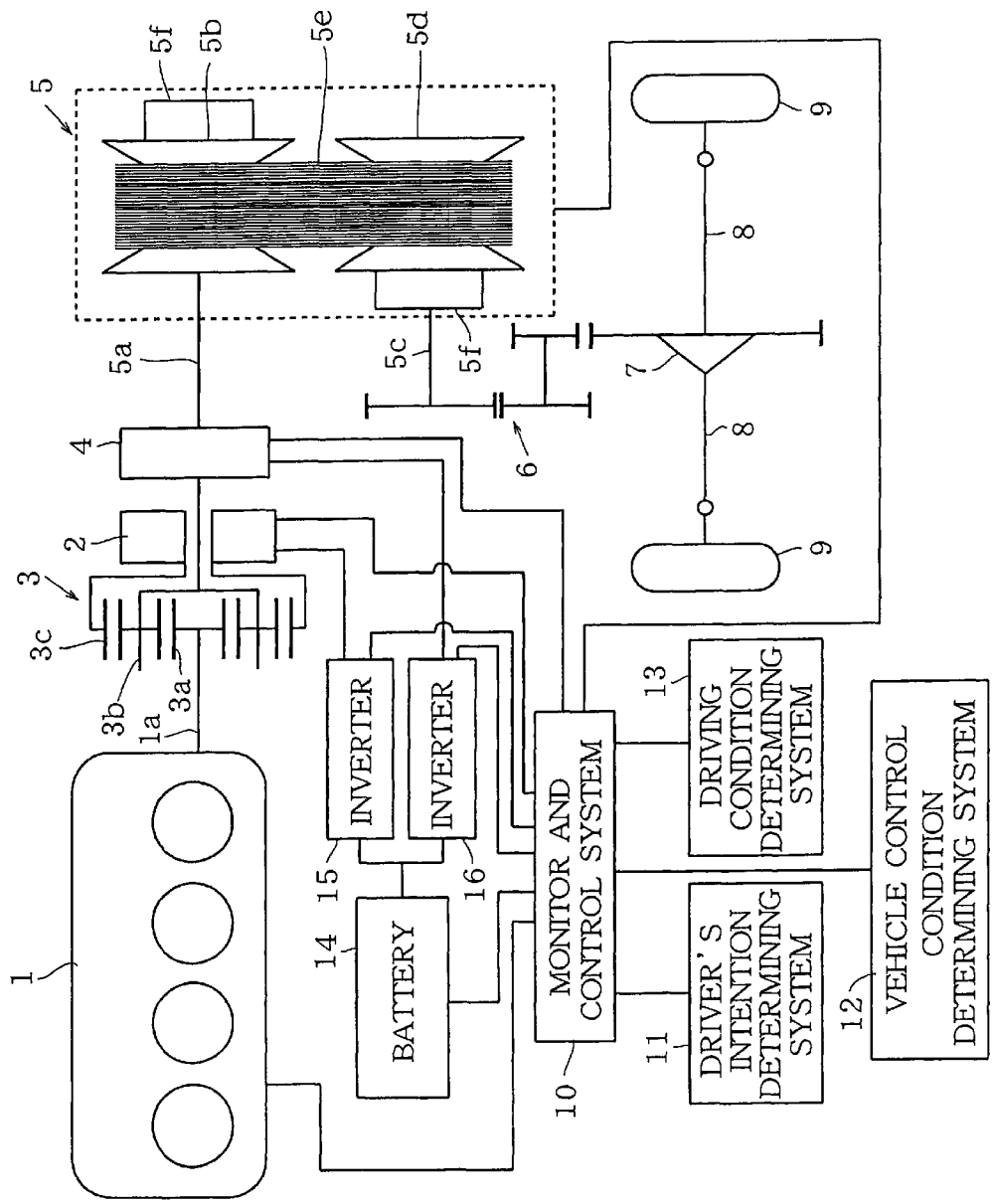
FIG. 17 is a block diagram showing a system according to a fifth embodiment of the present invention.

FIG. 17 shows the fifth embodiment of the present invention.

In the system of the fifth embodiment, the output shaft $1a$ of the engine 1 is connected to the sun gear $3a$ of the planetary gear train 3 and the motor 2 is connected to the ring gear $3c$.

The output power of the engine 1 and the output power of the motor 2 is added at the planetary gear 3 and the composed power is outputted from the carrier $3b$. The motor 4 is connected between the carrier $3b$ and the input shaft $5a$ of the CVT 5, thereby further adding the output power of the motor 4 to the composed power.

Figure 18:
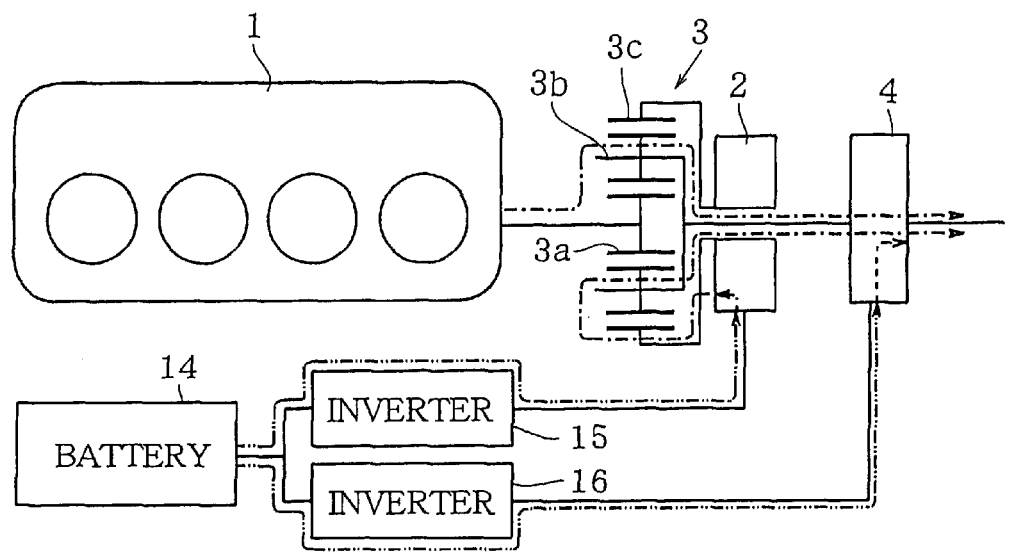
FIGS. 18 to 23 are block diagrams for explaining operations of the system.

As shown in FIG. 18, the driving force of the engine 1 is applied to the sun gear $3a$ as the input torque Ts. The electric energy of the battery 14 is applied to the motor 2 where the electric power is converted to the driving force which is applied to the ring gear $3c$ as the input torque Tr.

Furthermore, the electric energy is also applied to the motor 4, and the converted driving force is added to the output torque Tc of the carrier $3c$.

A maximum torque Tout applied to the CVT 5 is expressed by the following formula (6).

$$T_{out} = T_c + T_m = T_s + T_r + T_m \quad (6)$$

Where Tm is the output torque of the motor 4.

Since the relationship between input torque and output torque of each member of the planetary gear 3 is determined by the gear ratio i of the planetary gear 3, if the rpm of the motor 2 is controlled, the rpm of the engine 1 can be arbitrarily set regardless of the output rpm of the planetary gear 3. Therefore, it is possible to stop the engine 1 during the driving of the vehicle, or to control the engine 1 so as to be operated in an rpm range of economical fuel consumption.

Figure 19:
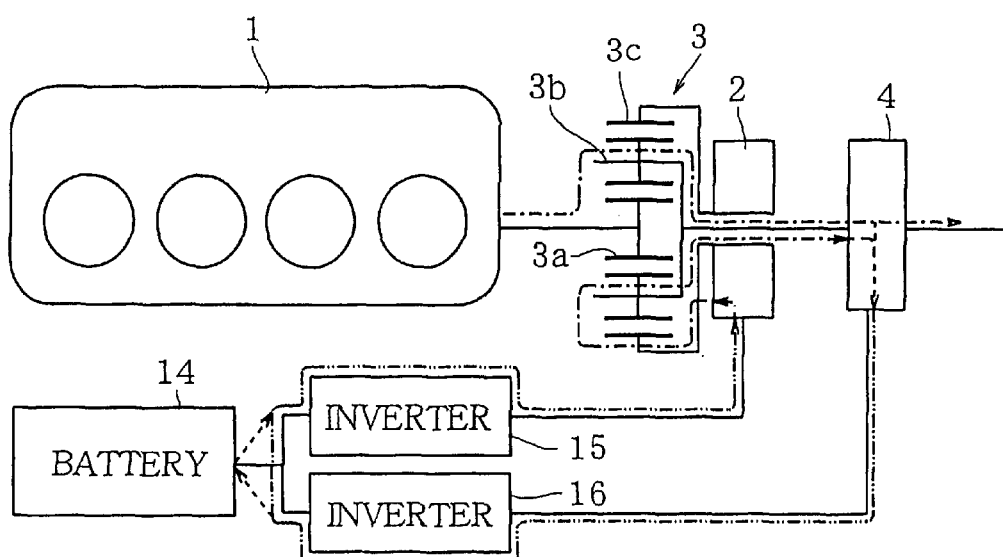

As described hereinbefore, the input torque Tr to the ring gear 3c is 1/i times of the input torque to the sun gear 3a. However, since the input torque Tr to the ring gear 3c is obtained only by the motor 2, it is necessary to supply the electric power to the motor 2 from the battery 14. Therefore, during the long driving, the motor 4 is used as the power generator and generated electric power is supplied to the motor 2 as shown in FIG. 19.

In the above described condition, when the charging of the battery 14 becomes necessary, the system is controlled so that the power generating quantity of the motor 4 becomes larger than the necessary electric power for the motor 2.

When it is necessary to increase the assist force of the motor 2 to the driving force of the engine 1 because of a heavy load at climbing, rapid acceleration, or others, the generating power of the motor 4 is reduced and the electric power of the battery 14 is supplied to the motor 2.

On the other hand, at the deceleration or braking, when the charging of the battery 14 is not necessary, the driving force from the wheels is absorbed by the engine braking and the electric power generation by the motor 2.

Figure 20:
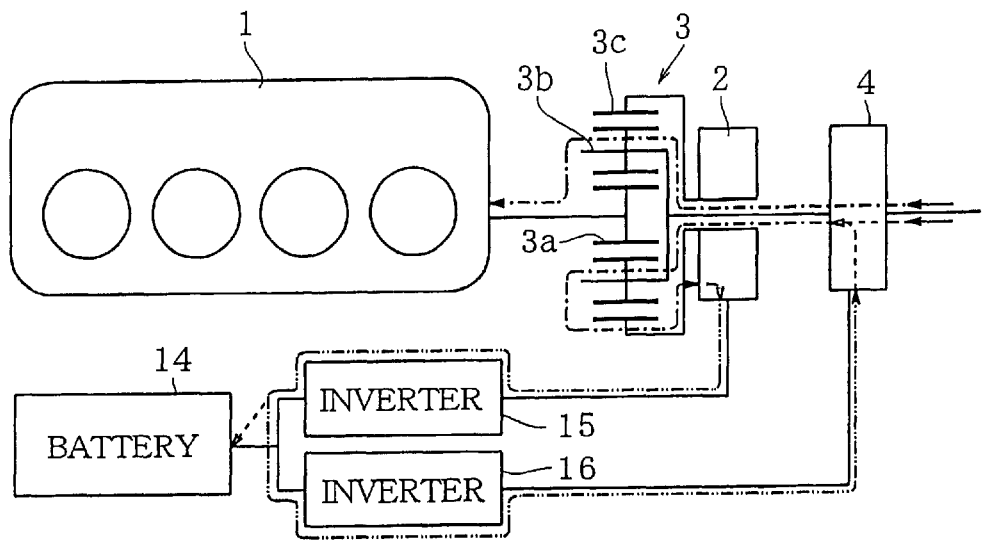

In this case, the motor 4 is driven by the electric power generated by the motor 2 and the driving force of the motor 4 to be added to that coming from the wheels is consumed by the electric power generation by the motor 2, as shown in FIG. 20. Therefore, braking force becomes equivalent to the engine braking.

When the charging of the battery 14 becomes necessary, the electric power to be supplied to the motor 4 is reduced, so that the battery 14 can be charged, maintaining the generating quantity of the motor 2 without reducing the engine braking effect.

Figure 21:
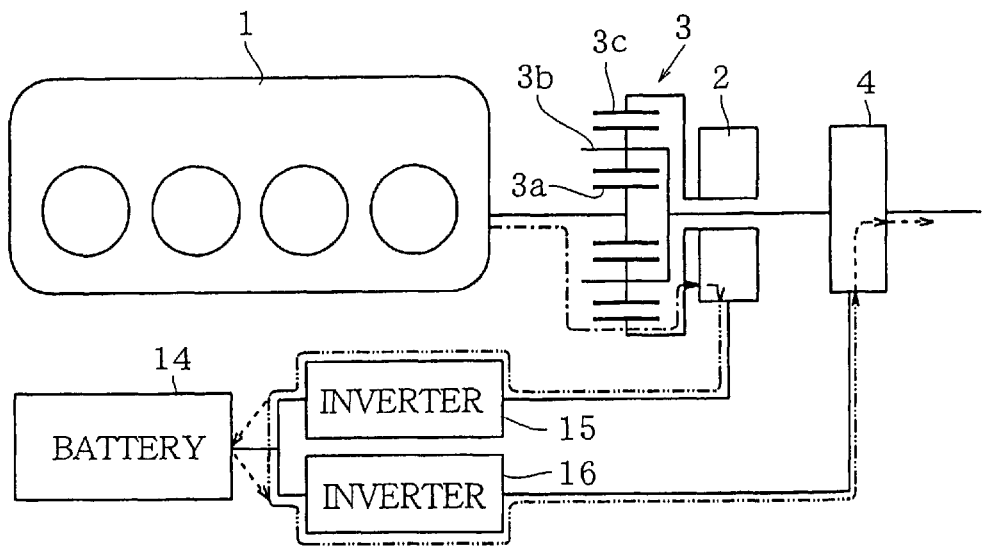

In order to back the vehicle, the vehicle is driven by the motor 4. In the case that the charged quantity of the battery 14 is insufficient, the output torque of the engine 1 is controlled to drive the motor 2 as the power generator, thereby charging the battery 14 as shown in FIG. 21. In such a condition, it is possible to drive the vehicle only by the electric power charged in the battery 14 or to drive while charging by the motor 2.

As described above, since the relationship between input torque and output torque of each member of the planetary gear 3 is determined by the gear ratio i of the planetary gear 3, if the rpm of the motor 2 is controlled, the rpm of the engine 1 and the rpm of the carrier 3b can be controlled. Therefore, at a low vehicle speed, by increasing the rpm of one of the sun gear 3a and the ring gear 3c, it is possible to stop the other member, or to reversely rotate the output shaft, while operating the engine 1.

At a high vehicle speed, if the rpm of one of the motor is kept constant, the rpm of the other motor must be increased higher than the output rpm of the planetary gear 3.

Figure 22:
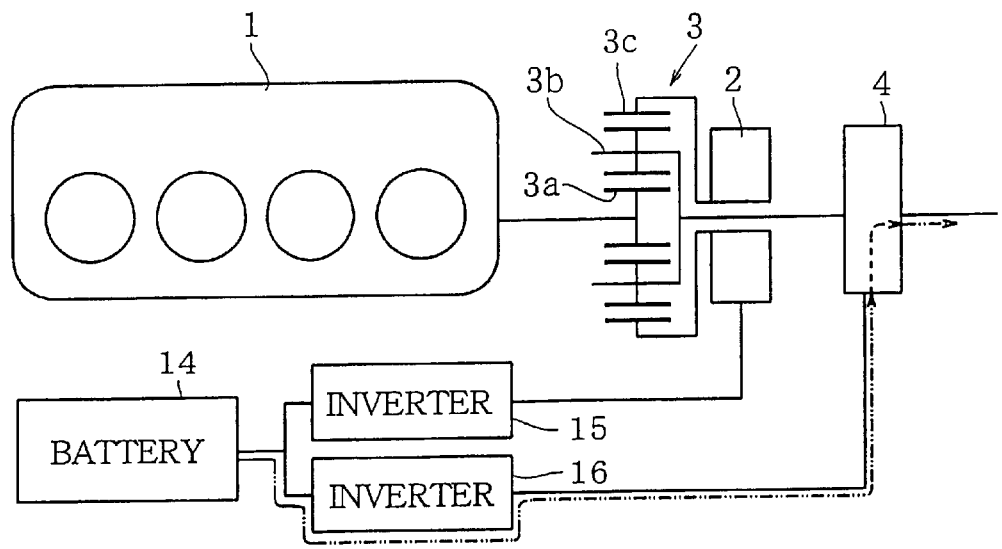
Figure 23:
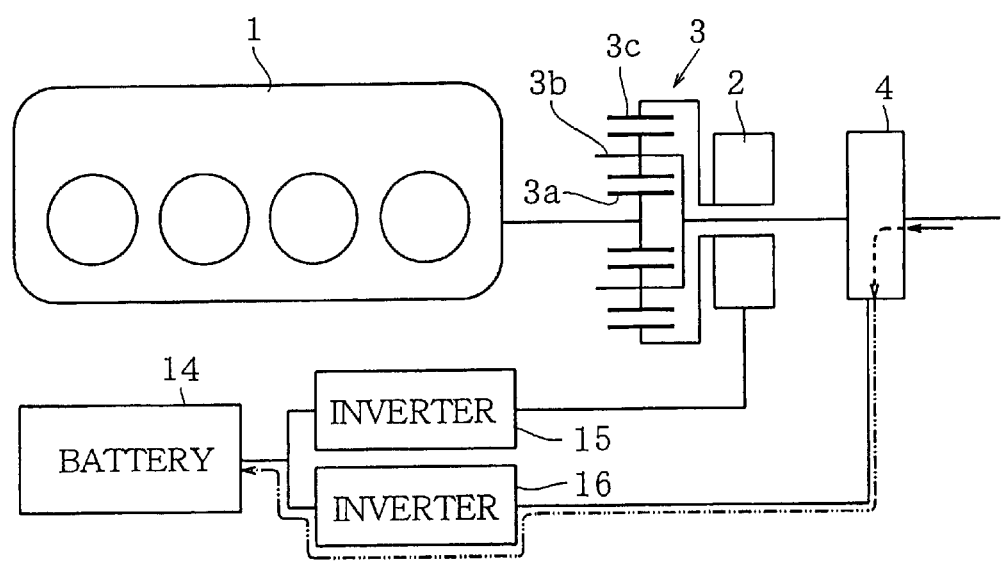

If the motor 2 is not operated, the planetary gear 3 does not produce the driving force. Therefore, as shown in FIG. 22, it is possible to produce the driving force for driving the vehicle by controlling the motor 4 and the transmission ratio of the CVT 5 without using the driving force from the planetary gear 3. Furthermore, as shown in FIG. 23, it is possible to produce the braking force for braking the vehicle by controlling only the motor 4 and the transmission ratio of the CVT 5.

If the motor 2 is caused not to produce the driving force and braking force, the vehicle can be driven only by controlling the motor 4 and the CVT 5 regardless of the operating condition of the engine 1. Therefore, the control operation becomes simple.

Thus, by keeping the using conditions of the engine 1 and the motors 2 and 4 in an optimum range by controlling the CVT 5, it is possible to increase the frequency in use of the engine 1 in a range of high combustion efficiency and low exhaust emission, for the change of the vehicle speed and the vehicle driving force.

In accordance with the fifth embodiment, since the control operations of the motor 2 and 4 are not influenced by each other, the motors can be properly and simply controlled in an operating range of high efficiency.

Figure 24:
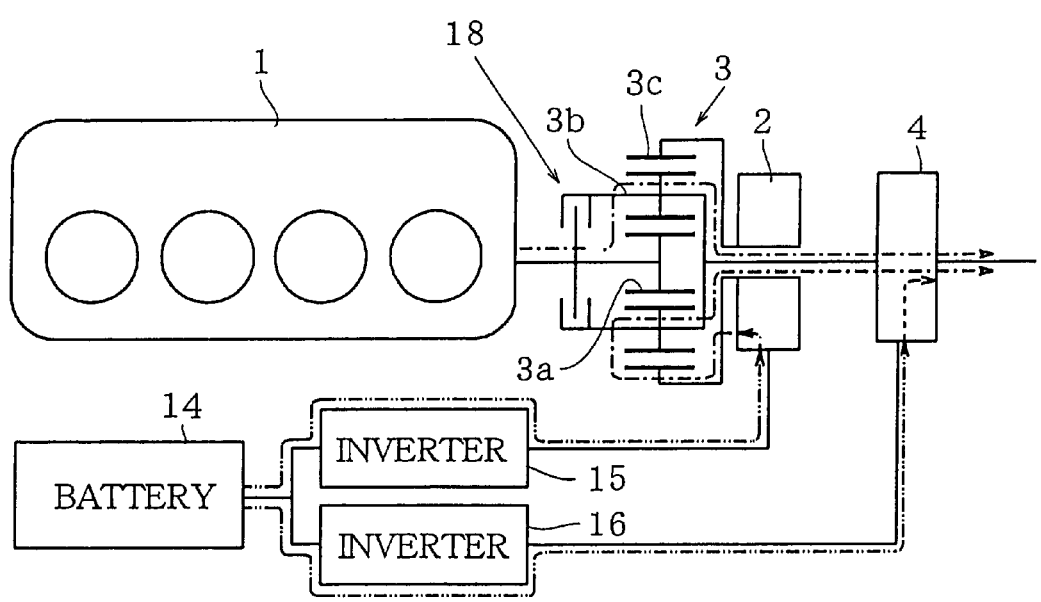
FIG. 24 is a block diagram showing a system according to a sixth embodiment of the present invention.

FIG. 24 shows the sixth embodiment of the present invention.

The system is composed by providing the clutch 18, similarly to the second embodiment between the sun gear 3a and the carrier 3b of the planetary gear 3 in the system of the fifth embodiment.

In the releasing state of the clutch 18, the operation is the same as the fifth embodiment, and in the clutch engaging state, the operation is the same as the second embodiment.

Although the clutch 18 is disposed between the sun gear 3a and the carrier 3b in the above described embodiments, the clutch 18 may be disposed between any two members of the planetary gear.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A power transmitting system for a hybrid motor vehicle having, an internal combustion engine (1) mounted on said vehicle for outputting a driving force to wheels (9,9) via an output shaft (1a), a continuously variable transmission (5) coaxially and rotatably connected to said output shaft (1a) for changing a rotating speed thereof, a battery (14) mounted on said hybrid vehicle for storing and providing an electric energy therefrom to various electric equipment, and a pair of inverters (15,16) electrically connected to said battery (14) for changing a type of electric currents, comprising:

a first motor (2) coaxially and mechanically connected to said output shaft (1a) and electrically connected to said inverter (15) for assisting power to said wheel and for being usable as a generator in order to re-charge said battery (14) if said first motor (2) has an abundant energy;

a second motor (4) interposed between said first motor (2) and said transmission (5) and electrically connected to said inverter (16) for assisting said engine (1) and for being usable as said generator in order to re-charge said battery (14) if said second motor (4) has said abundant energy;

a planetary gear (3) interposed between said first motor (2) and said second motor (4) for alternatively and effectively using said motors (2,4) so as to be interchangeably usable not only for assisting said engine (1) but also for charging said battery (14) as required;

an intentional condition judging system (11) for detecting operational conditions of a driver and for outputting an intentional decision signal, a driving control judging system (12) for detecting control conditions of said vehicle and for outputting a control signal, a running condition judging system for detecting running condition of said vehicle and for outputting a driving condition signal; and a monitor and control system (10) responsive to said intentional decision signal, said control signal and said driving condition signal for concentrically and synthetically controlling said engine (1) so as to assist said engine (1) by effectively and economically using both said motors (2, 4) and to be usable as an engine brake by supplying said electric energy from said first motor (2) to said second motor (4).

2. The power transmitting system for the hybrid motor vehicle according to claim 1, further comprising:

a clutch (18) permanently and mechanically fixed on a carrier (3b) of said planetary gear (3) and electronically connected to said monitor and control system (10) for connecting a sun gear (3a) with said carrier (3b) of said planetary gear (3) and for disconnection thereof so as to be selectively usable of both said first and/or second motors (2,4) and to assist said engine (1) by two relatively small electric said motors (2,4).

3. The power transmitting system for the hybrid motor vehicle according to claim 2, wherein:

said clutch (18) permanently and mechanically is fixed on said carrier (3b) of said planetary gear (3) and electronically connected to said monitor and control system (10) for connecting said sun gear (3a) with a ring gear (3c) of said planetary gear (3) and for disconnection thereof so as to be selectively usable of both said first and/or second motors (2,4) and to assist said engine (1) by two relatively small electric said motors (2,4).

4. The power transmitting system for the hybrid motor vehicle according to claim 2, wherein:

said clutch (18) permanently and mechanically is fixed on said carrier (3b) of said planetary gear (3) and electronically connected to said monitor and control system (10) for connecting said carrier (3b) with said ring gear (3c) of said planetary gear (3) and for disconnection thereof so as to be selectively usable of both said first and/or second motors (2,4) and to assist said engine (1) by two relatively small electric said motors (2,4).

5. A hybrid motor vehicle comprising:

an engine;

a planetary gear having three members of a sun gear, a carrier and a ring gear, the carrier rotatably supporting a plurality of pinions each of which engages with the sun gear, the ring gear engaging with the pinions;

a first motor connected between an output shaft of the engine and a first member of the planetary gear, and interchangeably usable as either a driving source or a power generator;

a second motor connected to a third member of the planetary gear, and interchangeably usable as either a driving source or a power generator; and a transmission connected to a second member of the planetary gear, and for changing speed ratio between the second member of the planetary gear and driving wheels;

wherein the first member of the planetary gear is the sun gear, the second member is the carrier, and the third member is the ring gear.

6. A hybrid motor vehicle comprising:

an engine;

a planetary gear having three members of a sun gear, a carrier and a ring gear, the carrier rotatably supporting a plurality of pinions each of which engages with the sun gear, the ring gear engaging with the pinions;

a first motor connected between an output shaft of the engine and a first member of the planetary gear, and interchangeably usable as either a driving source or a power generator;

a second motor connected to a third member of the planetary gear, and interchangeably usable as either a driving source or a power generator; and a transmission connected to a second member of the planetary gear, and for changing speed ratio between the second member of the planetary gear and driving wheels.

7. The hybrid motor vehicle according to claim 6, further comprising:

a connecting mechanism for engaging two members selected from the first, second and third members of the planetary gear.

8. The hybrid motor vehicle according to claim 6, wherein the transmission is adapted to be a continuously variable transmission.

9. The hybrid motor vehicle according to claim 6, further comprising:

an intentional condition judging system for detecting operational conditions of a driver and for outputting an intentional decision signal;

a driving control judging system for detecting control conditions of said vehicle and for outputting a control signal;

a running condition judging system for detecting running conditions of said vehicle and for outputting a driving condition signal; and a monitor and control system responsive to said intentional decision signal, said control signal and said driving condition signal for concentrically and synthetically controlling said engine so as to assist said engine by effectively and economically using both said motors and to be usable as an engine brake by supplying electric energy from said first motor to said second motor.

10. The hybrid motor vehicle according to claim 6, wherein the second motor is drivable by divided electrical power, and whereby the third member is controllable.

* * * * *